(12) United States Patent
Nguyen et al.

(10) Patent No.: US 8,066,954 B2
(45) Date of Patent: Nov. 29, 2011

(54) PLUG FLOW REACTOR AND POLYMERS PREPARED THEREWITH

(75) Inventors: Thanh T. Nguyen, Sugar Land, TX (US); Jay L. Reimers, Houston, TX (US)

(73) Assignee: Fina Technology, Inc., Houston, TX (US)

( * ) Notice: Subject to any disclaimer, the term of this patent is extended or adjusted under 35 U.S.C. 154(b) by 386 days.

(21) Appl. No.: 12/337,357

(22) Filed: Dec. 17, 2008

(65) Prior Publication Data
US 2009/0148351 A1    Jun. 11, 2009

Related U.S. Application Data

(62) Division of application No. 11/128,803, filed on May 13, 2005, now Pat. No. 7,511,101.

(51) Int. Cl.
*B01J 19/00* (2006.01)
*B01J 19/18* (2006.01)
*B01J 10/00* (2006.01)
*F28D 7/00* (2006.01)

(52) U.S. Cl. ........ 422/198; 422/129; 422/131; 422/200; 422/201; 422/224; 422/225; 422/600; 422/630; 422/642; 422/644; 422/645; 422/646

(58) Field of Classification Search .................. 422/198, 422/200, 201, 105, 209, 224, 225, 131, 129, 422/211, 600, 630, 642, 644–646; 585/241
See application file for complete search history.

(56) References Cited

U.S. PATENT DOCUMENTS

| | | | | |
|---|---|---|---|---|
| 2,727,884 A | * | 12/1955 | Coulter et al. | 526/88 |
| 4,460,278 A | * | 7/1984 | Matsubara et al. | 366/149 |
| 4,675,377 A | * | 6/1987 | Mobley et al. | 528/215 |
| 5,145,255 A | * | 9/1992 | Shimada et al. | 366/325.92 |
| 6,057,483 A | * | 5/2000 | Zakoshansky et al. | 568/798 |

FOREIGN PATENT DOCUMENTS

| | | |
|---|---|---|
| DE | 10322106 A1 | 11/2004 |
| GB | 701236 A | 12/1953 |
| GB | 994789 A | 6/1965 |
| GB | 1238943 A | 7/1970 |
| NL | 7002671 A | 8/1971 |

* cited by examiner

*Primary Examiner* — Walter Griffin
*Assistant Examiner* — Natasha Young

(57) ABSTRACT

A plug flow reactor having an inner shell 27 surrounded by outer shell 21 and having at least one annular flow passage 35 therebetween can be used to prepare compositions, including polymers. The plug flow reactor also includes inlet port 36, an outlet port 37 and a plurality of exchanger tubes 26 wherein the exchanger tubes are in fluid communication to the at least one annular flow passage. Polystyrene and high impact polystyrene can be prepared using the reactor.

21 Claims, 2 Drawing Sheets

A - A

PLUG FLOW REACTOR AND POLYMERS PREPARED THEREWITH

CROSS-REFERENCE TO RELATED APPLICATIONS

This application claims the benefit of U.S. patent application Ser. No. 11/128,803, filed May 13, 2005.

BACKGROUND OF THE INVENTION

1. Technical Field

The invention relates to a plug flow reactor. The invention particularly relates to a plug flow reactor for use in preparing polystyrene and impact polystyrene.

2. Background of the Art

Exothermic processes for the production of compositions such as, for example, polystyrene are known. In these processes, the reactants are first heated to initiate the reaction, but then the reactants are cooled during the reaction. The capacity to cool the reactants is often a limiting process parameter.

Such highly exothermic processes, unless carefully controlled, can cause the operation of reactors both to be hazardous and to lead to undesirable side reactions. For example, in the production of synthetic natural gas, run-away reactor conditions can lead to the depositing of coke and eventually plugging the equipment. Control of such reactors can be further complicated as a commercial reactors generally must handle reactant feeds that may vary widely in composition over a given period of time.

One solution to this problem is to use a back-mixed reactor. In such a reactor there ideally is no temperature gradient as the material within the reactor is of uniform composition and temperature. There are several means of achieving a back-mixed reactor which means are well known to those versed in the art. These include the use of a fluidized bed of solid material as well as back-mixing by purely hydrodynamic means. While the back-mixed reactor is a satisfactory manner of solving the problem of temperature control, it has several disadvantages when compared to a plug-flow reactor. Many applications require reaction conditions having minimal back-mixing such as that found in a plugflow reactor. Also, use of a back-mixed reactor may lead to problems in the formation of unwanted by-products.

Thus, it would be desirable in the art to prepare certain products using a plug flow reactor that has good temperature control and is economical to employ.

SUMMARY OF THE INVENTION

In one aspect, the invention is a plug flow reactor 10 having an inner shell 27 surrounded by an outer shell 21 and having at least one annular flow passage 35 therebetween. The plug flow reactor also includes inlet port 36, an outlet port 37 and a plurality of exchanger tubes 26 wherein the exchanger tubes are in fluid communication to the at least one annular flow passage.

In another aspect, the invention is a process for preparing a polymer, the process including feeding reactants to a plug flow reactor 10 having an inner shell 27 surrounded by an outer shell 21 and having at least one annular flow passage 35 therebetween. The plug flow reactor also includes inlet port 36, an outlet port 37 and a plurality of exchanger tubes 26 wherein the exchanger tubes are in fluid communication to the at least one annular flow passage.

In still another aspect, the invention is a composition including a polymer prepared using a process including feeding reactants to a plug flow reactor 10 having an inner shell 27 surrounded by an outer shell 21 and having at least one annular flow passage 35 therebetween. The plug flow reactor also includes inlet port 36, an outlet port 37 and a plurality of exchanger tubes 26 wherein the exchanger tubes are in fluid communication to the at least one annular flow passage.

Another aspect of the invention is a plug flow reactor 10 including an inner shell 27 surrounded by an outer shell 21 and having at least one annular flow passage 35 therebetween and additionally including an inlet port 36, an outlet port 37. The reactor also includes a plurality of exchanger tubes 26 wherein the exchanger tubes are in fluid communication to the at least one annular flow passage and wherein the plug flow reactor further includes a mixer having at least one set of blades that are configured for easy removal.

In yet another aspect, the invention is a plug flow reactor 10 including an inner shell 27 surrounded by an outer shell 21 and having at least one annular flow passage 35 therebetween. The reactor additionally includes an inlet port 36, an outlet port 37 and a plurality of exchanger tubes 26 wherein the exchanger tubes are in fluid communication to the at least one annular flow passage and wherein the plug flow reactor additionally comprises at least 3 zones. The reactor also includes a temperature controller and at least one sensor port 23 housing at least one thermal couple sensor in each of the zones and the controller controls the temperature in each zone independently.

DETAILED DESCRIPTION OF THE INVENTION

Figure 1A:
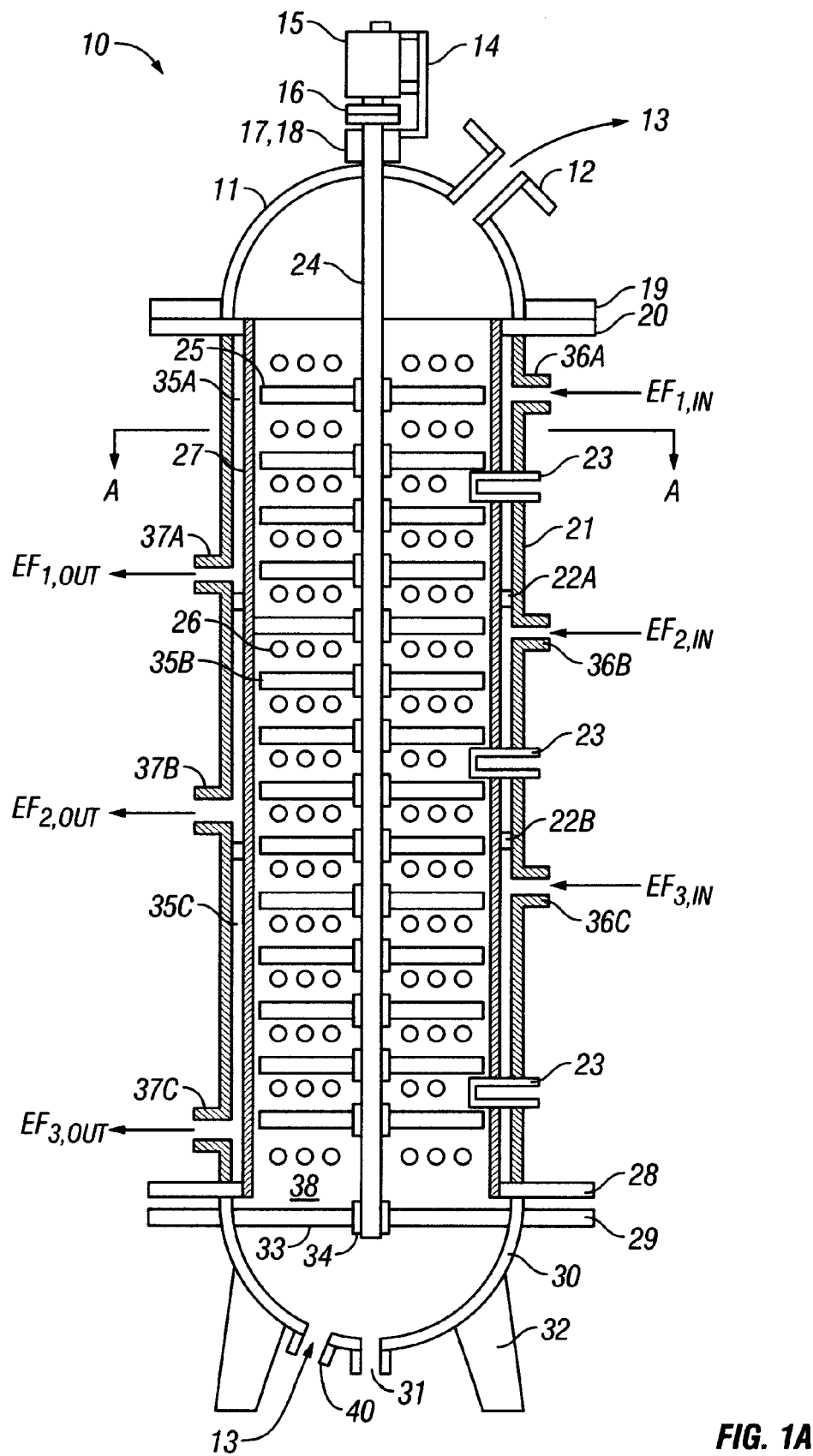
FIG. 1A is a schematic illustration of a side view of one embodiment of the plug flow reactor of the invention.

In one aspect, the invention is a plug flow reactor having an inner shell surrounded by outer shell and having at least one annular flow passage therebetween. This reactor may be used for any process that requires a plug flow reactor, but is especially desirable for those reactions that require an initial heating and then cooling, such as occurs in the polymerization of styrene and rubber modified styrene. The reactor of the invention is desirably efficient at removing heat and maintaining a plug flow as the reactants pass through the reactor.

Another advantage of the reactor is that it may be manufactured comparatively inexpensively. In some embodiments of the invention, the outer shell acts, in effect, as a common header for all of the heat exchanger tubes in a section of the plug flow reactor. This is a significant advantage over the prior reactors that required a separate flange to a heat transfer fluid source.

The reactor of the invention can be easily controlled. Each section of the reactor may have a one or even a plurality of sensors. By controlling the flow through the inlet, using as few as a single flow controller or by controlling the temperature of the heat transfer fluid, the temperature of each zone may be controlled.

The reactor of the invention can be used for any reaction where it would be desirable to combine reactants under plug flow conditions. The reactor is particularly suitable for making polymers such as polystyrene and rubber modified polystyrene. Homopolymers and rubber modified polymers of monovinylaromatic monomers can be prepared. For example, the reactor may be used to prepared rubber-reinforced polymers of monovinylaromatic compounds, such as styrene, alphamethyl styrene and ring-substituted styrenes. More particularly, rubber reinforced polymers of styrene having included therein discrete particles of a crosslinked rubber, for example, polybutadiene, the discrete particles of rubber being dispersed throughout the styrene polymer matrix, can be preparared with reactor.

Such polymers can be used in a variety of applications including refrigerator linings, packaging applications, furniture, household appliances and toys. The conventional term for such rubber reinforced polymers is "High Impact Polystyrene" or "HIPS". The physical characteristics and mechanical properties of HIPS are dependent upon many factors, including the particle size of the cross-linked rubber particles. One of the most desirable characteristics of HIPS materials is the ability of such materials to resist degradation or destruction by factors such as contact with foods and edible oils. In addition, other properties which must be maintained for such articles include flexural strength, tensile strength, and impact properties.

Suitable monovinylaromatic compounds that may be used with the invention include styrene as well as styrenes alkylated in the nucleus or side-chain as alphamethyl styrene and vinyltoluene. The monovinylaromatic compounds may be employed singly or as mixtures. In one embodiment, styrene is the monovinylaromatic compound of preference. The high impact polystyrene (HIPS) manufactured may be formed by polymerizing the monovinylaromatic compound in the presence of the rubber and, optionally, a combination of initiators which include, for example a combination of perketals and peroxycarbonates. The level of rubber utilized may be in the range of about 5-15% by weight of the solution. The polymerization is carried out in a conventional manner, the rubber first being dissolved in the polymerizable monomer and this solution then being subjected to polymerization in the presence of the initiator combination. Any suitable polymerization initiator may be used with the invention. Suitable chain transfer agents, e.g., mercaptans or alphamethyl styrene dimer, may also be added to control polymer molecular weight and rubber particle size.

Figure 1B:
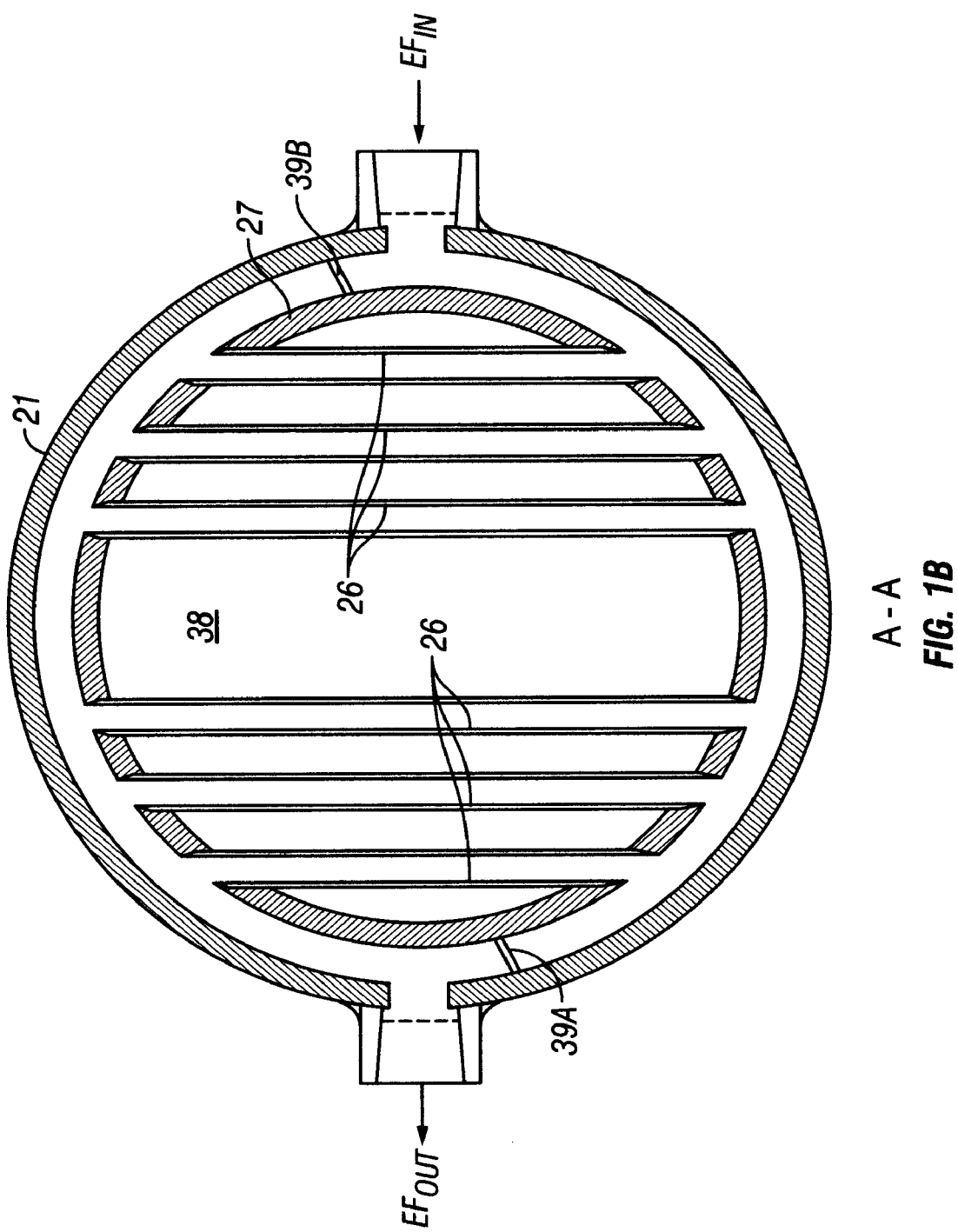
FIG. 1B is schematic illustration of a cross sectional view of one embodiment of the plug flow reactor of the invention.

The Figures illustrate an embodiment of the plug flow reactor. In FIGS. 1A and 1B, in an exemplary embodiment, plug flow reactor 10 comprises inner shell 27 surrounded by outer shell 21 and having annular flow passages 35$a,b,c$ therebetween. Annular passage 35$a$ is defined in the axial direction by upper shell flange 20 and by baffle plate 22$a$. Baffle plate 22$a$ is an annular ring attached to both inner shell 27 and outer shell 21 and prevents fluid from passage 35$a$ from mixing. Passage 35$b$ is axially defined by baffle, plates 22$a$ and 22$b$. Passage 35$c$ is axially defined by baffle plate 22$b$ and lower shell flange 28. Inlet ports 36$a,b,c$ and exit ports 37$a,b,c$ are attached to outer shell 21 and provide ingress and egress for exchanger fluid $EF_{1,2,3}$ to passages 35$a,b,c$, respectively. Inner shell 27 provides axial flow path 38 for product fluid 13. The product flow may be from bottom to top, as shown, or, alternatively, from top to bottom depending on the particular product and process constraints. This decision is site specific and may be determined by one skilled in the art, without undue experimentation. The flow passages essentially create three axial zones in which the product fluid temperature may be controlled.

Exchanger tubes 26 are attached to inner shell 27 and extend across axial flow path 38, see FIG. 1B. Exchanger tubes 26 are attached to shell 27 by any suitable method known in the art. Exchanger fluid $EF_{1,2,3}$ passes through exchanger tubes 26 in each of the respective zones. The exchanger fluid in each zone may be at a different temperature depending on the product reaction requirements. The exchanger fluid may be used to heat or cool the product fluid, as required. The exchanger fluid in one particular zone may be different than the exchanger in another particular zone. Exchanger fluid $EF_{1,2,3}$ includes, but is not limited to, water, oil, special heat transfer fluids commercially available, and other product flow streams, or combinations of these. In one embodiment, the fluid is air.

The exchanger tubes increase the area of contact with the appropriate temperature thereby keeping the product flow at a more uniform temperature throughout the cross sectional flow path within the zone of each flow passage. This acts to reduce non-uniform product reaction due to temperature variation between inner shell 27 and the bulk fluid temperature of product fluid 13 in each zone. Sensor port 23 is included in each zone. For example, temperature may be measured in each zone and used to control the flow of exchanger fluid EF to adjust and/or maintain the temperature in any particular zone to a desired temperature for the appropriate reaction model. Temperature sensors include, but are not limited to, thermocouples and resistance temperature devices. The number and size of exchanger tubes 26 is process specific and may be determined on a job by job basis, without undue experimentation, using heat transfer analysis techniques known in the art.

Top head 11, which may be flat or elliptical, has flange 19 attached thereto and is connected to upper shell flange 20 using techniques known in the art. Likewise, bottom head 30 has flange 29 attached thereto and is attached to bottom shell flange 28. Top head 11 has mixer motor bracket 14 attached thereto. Mixer motor 15 is mounted on bracket 14 and is coupled by coupling 16 to mixer shaft 24. Mixer shaft 24 extends through port 17, having bushing 18, or in an alternative embodiment, a steady bearing, not shown, and along the length of axial flow passage 38, and is supported at its bottom end in bushing 34. Bushing 34 is attached to support member 33 that is attached to bottom head 30. Shaft 24 has mixer blades 25 attached along the shaft length in between the rows of exchanger tubes 26. The blades extend near the inner surface of inner shell 27. Blades 25 act to shear the product fluid 13 and to prevent any build up on the surfaces of inner shell 27 and exchanger tubes 26. The shearing action also serves to mix product fluid 13 and provide more uniform fluid temperature within each zone. In one embodiment, the blades server to produce radial mixing but minimal backmixing.

Bottom head 30, which may be flat or elliptical, includes product inlet port 40 and drain port 31. Support stand 32 is attached to bottom head 30, or in an alternative embodiment, to the straight shell section of the reactor, not shown. Both top head 11 and bottom head 30 may include additional ports (not shown) for introducing addition flow streams as required for the particular product fluid 13. Such ports are considered to be design choices and are not described here.

In an alternative embodiment, the plug flow reactor additionally comprises at least one additional baffle to force all or substantially all flow in the annular flow passage through the exchanger tubes. In one embodiment, there are two which are shown in FIG. 1B wherein baffles 39A and 39B function to direct substantially all flow from inlets through the exchanger tubes 26.

While described, herein, as having three zones, any number of zones may be included. In addition, while shown as a vertical vessel, the present invention is intended to encompass horizontal vessels as well. The materials used in the present invention are process specific and may be selected for compatibility with the product fluid using techniques known in the art.

The blades of the mixer are configured for easy removal. For a two blade mixed, the blades are inherently easily removed because the heat exchanges tubes are also straight. One need merely turn the blades until the are parallel to the heat exchanger tubes and lift them directly out of the reactor. This is very different from the prior art reactors which have curved heat exchanges tubes. While characterized as a mixer, in some embodiments the mixer is effectively an agitator, functioning to provide radial mixing and causing little or no back mixing.

For mixer blades having more than two blades, removal is still easy provided the blades are staggered on the mixer shaft. For example, in one embodiment, a 4 blade mixer will have one par of blades and a second pair of blades that perpendicular and are offset down the shaft from the first pair by a distance greater than the diameter of the heat exchanger tubes. To remove a mixer blade of this configuration, one need only align the first set with the heat exchanger tubes and then pull the first set of blades past the heat exchanger tubes. The mixer shaft is then rotated 90° and the second set of blades are aligned and then pulled through the heat exchanger tubes.

In an alternative embodiment, the heat exchange tubes may be staggered to increase heat transfer. Staggering the heat transfer tubers may also have a positive affect on mixing.

The reactor of the invention can, in one embodiment, be the sole reactor in a process for preparing a polymer. In another embodiment, the reactor may be but one of several reactors used to prepare a polymer. The reactor may be employed in any application where a plug flow reactor is conventionally employed.

What is claimed is:

1. A plug flow reactor comprising: an inner shell surrounded by an outer shell and having at least one annular flow passage therebetween; an inlet port, an outlet port and a plurality of exchanger tubes, wherein the exchanger tubes are in fluid communication with the at least one annular flow passage; a plurality of zones that may be heated or cooled independently; and at least one mixer, wherein the mixer has a set of blades within each zone of the reactor, and wherein the mixer has a set of blades within each zone of the reactor that are configured for easy removal from the reactor by aligning the blades with the heat exchanger tubes and then pulling the blades past the heat exchanger tubes.

2. The plug flow reactor of claim 1 additionally comprising at least one baffle which functions to block fluid communication in the at least one annular flow passage except through the exchanger tubes.

3. The plug flow reactor of claim 2 wherein there are at least two baffles which function to block substantially all fluid communication in the at least one annular flow passage except through the exchanger tubes.

4. The plug flow reactor of claim 1 wherein the reactor is vertical.

5. The plug flow reactor of claim 1 wherein the reactor is horizontal.

6. The plug flow reactor of claim 1 wherein the plug flow reactor comprises at least 3 zones.

7. The plug flow reactor of claim 1 wherein the blades are designed to produce radial mixing with minimal to no back mixing within each zone of the reactor.

8. The plug flow reactor of claim 1 additionally comprising a temperature controller.

9. The plug flow reactor of claim 1 additionally comprising a sensor port housing a thermocouple sensor.

10. The plug flow reactor of claim 1 additionally comprising a top head and a bottom head.

11. The plug flow reactor of claim 1 where, in one zone of the reactor there are a first pair of blades and a second pair of blades that are perpendicular and the second pair is offset down a shaft from the first pair by a distance greater than the diameter of the heat exchanger tubes.

12. The plug flow reactor of claim 11 wherein the first pair of blades and the second pair of blades are configured for removal from the reactor by aligning the first pair of blades with the heat exchanger tubes and then pulling the first pair of blades past the heat exchanger tubes, rotating the mixer shaft 9020 to align the second pair of blades with the heat exchanger tubes and pulling the second pair of blades past the heat exchanger tubes.

13. The plug flow reactor of claim 1 wherein the heat exchanger tubes are not curved.

14. The plug flow reactor of claim 13 wherein the heat exchanger tubes are straight.

15. A plug flow reactor comprising: an inner shell surrounded by an outer shell and having at least one annular flow passage therebetween; and additionally comprising an inlet port, an outlet port and a plurality of exchanger tubes; wherein the exchanger tubes are in fluid communication to with the at least one annular flow passage and wherein the plug flow reactor further comprises a mixer having at least one set of blades which are configured for easy removal from the reactor by aligning the blades with the heat exchanger tubes and then pulling the blades cast the heat exchanger tubes.

16. The plug flow reactor of claim 15 the mixer comprising a bushing or a steady bearing.

17. The plug flow reactor of claim 15 additionally comprising a stand.

18. The plug flow reactor of claim 15 where, in one zone of the reactor there are a first pair of blades and a second pair of blades that are perpendicular and the second pair is offset down a shaft from the first pair by a distance greater than the diameter of the heat exchanger tubes.

19. The plug flow reactor of claim 18 wherein the first pair of blades and the second pair of blades are configured for removal from the reactor by aligning the first pair of blades with the heat exchanger tubes and then pulling the first pair of blades past the heat exchanger tubes, rotating the mixer shaft 90.degree. to align the second pair of blades with the heat exchanger tubes and pulling the second pair of blades past the heat exchanger tubes.

20. The plug flow reactor of claim 15 wherein the heat exchanger tubes are not curved.

21. The plug flow reactor of claim 20 wherein the heat exchanger tubes are straight.

* * * * *